(12) United States Patent
Reising

(10) Patent No.: US 7,871,708 B2
(45) Date of Patent: Jan. 18, 2011

(54) METAL AND POLYMER SUBSTRATES HAVING A POWDER BASECOAT AND LIQUID TOPCOAT

(75) Inventor: John C. Reising, North Ridgeville, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 794 days.

(21) Appl. No.: 11/064,394

(22) Filed: Feb. 23, 2005

(65) Prior Publication Data

US 2006/0188735 A1  Aug. 24, 2006

(51) Int. Cl.
*B32B 15/08* (2006.01)
*B32B 27/06* (2006.01)

(52) U.S. Cl. .................... 428/458; 428/480; 427/388.1

(58) Field of Classification Search ................. 428/458, 428/480; 427/388.1
See application file for complete search history.

(56) References Cited

U.S. PATENT DOCUMENTS

| | | | | |
|---|---|---|---|---|
| 3,888,943 A | 6/1975 | Labana et al. | ................ | 260/836 |
| 3,919,345 A | 11/1975 | Labana et al. | ........... | 260/830 R |
| 3,975,456 A | 8/1976 | Labana et al. | ................ | 260/836 |
| 3,991,133 A | 11/1976 | Siwiec et al. | ................ | 260/836 |
| 4,092,373 A | 5/1978 | Siwiec et al. | ........... | 260/830 R |
| 4,374,954 A | 2/1983 | Labana et al. | ................ | 525/207 |
| 4,681,811 A | 7/1987 | Simpson et al. | .............. | 428/413 |
| 4,801,680 A | 1/1989 | Geary et al. | ................ | 528/272 |
| 4,988,793 A | 1/1991 | Barbee et al. | ................ | 528/272 |
| 5,212,245 A | 5/1993 | Franks et al. | ................ | 525/223 |
| 5,214,101 A | 5/1993 | Pettit, Jr. et al. | ............ | 525/176 |
| 5,218,055 A | 6/1993 | Marrion et al. | ............. | 525/327 |
| 5,229,458 A | 7/1993 | Schimmel et al. | ........... | 525/108 |
| 5,407,707 A | 4/1995 | Simeone et al. | ............. | 427/410 |
| 5,472,649 A | 12/1995 | Chang et al. | ................... | 264/15 |
| 5,536,785 A | 7/1996 | Foukes et al. | ............... | 525/176 |
| 5,646,228 A | 7/1997 | Gras et al. | ..................... | 528/45 |
| 6,093,774 A | 7/2000 | Dumain | ...................... | 525/207 |
| 6,099,899 A | 8/2000 | Briggs et al. | ................. | 427/203 |
| 6,593,417 B1 * | 7/2003 | Anderson et al. | ........... | 524/588 |
| 6,624,276 B2 * | 9/2003 | Lamers et al. | ................. | 528/45 |
| 6,701,601 B2 | 3/2004 | Davidson et al. | .............. | 29/458 |
| 6,715,196 B2 * | 4/2004 | Reising et al. | ................ | 29/458 |

FOREIGN PATENT DOCUMENTS

| | | | |
|---|---|---|---|
| EP | 0307623 | | 3/1989 |
| EP | 0471409 A1 | | 8/1991 |
| EP | 0702064 A2 | | 8/1995 |
| WO | 84/01909 | * | 5/1984 |
| WO | WO94/10213 | | 5/1994 |
| WO | WO 03/053599 A1 | | 7/2003 |

\* cited by examiner

*Primary Examiner*—Kevin R. Kruer
(74) *Attorney, Agent, or Firm*—Steven W. Hays; Diane R. Meyers

(57) ABSTRACT

Composite coated metal and/or polymer substrates are provided having a powder basecoat thereon formed from at least one film-forming material comprising a thermosettable polyester and a curing agent; at least one reaction product of at least one cyclic carboxylic acid anhydride, at least one alkene and at least one reactant selected from the group consisting of primary amines, aliphatic polyamines, primary amino alcohols, alcohols, isocyanates and mixtures thereof, the copolymer having a number average molecular weight ranging from about 1,000 to about 20,000; and at least one flow control agent; and a topcoat deposited from a liquid or powder slurry topcoating composition applied over the basecoat to form a composite coating providing good adhesion and chip and cratering resistance.

19 Claims, No Drawings

METAL AND POLYMER SUBSTRATES HAVING A POWDER BASECOAT AND LIQUID TOPCOAT

BACKGROUND OF THE INVENTION

Field of the Invention

The invention relates to metal and polymer substrates coated with a powder basecoat that is compatible with a wide variety of liquid topcoats, providing good intercoat adhesion and resistance to chipping and cratering.

Today's automobile bodies are treated with multiple layers of coatings that not only enhance the appearance of the automobile, but also provide protection from corrosion, chipping, ultraviolet light, acid rain and other environmental conditions that can deteriorate the coating appearance and underlying car body.

The formulations of these coatings can vary widely. However, a major challenge that faces all automotive manufacturers is how to rapidly apply and cure these coatings with minimal capital investment and floor space, which is valued at a premium in manufacturing plants. Use of powder coatings is desirable because they emit very low amounts of volatile materials to the environment when cured and excess material can be easily recycled.

For example, U.S. Pat. No. 6,715,196 discloses a method of coating metallic substrates with a weldable primer coating having greater than 10 volume percent of electroconductive pigment, powder basecoat and clear top coat.

Despite recent improvements in color-plus-clearcoating systems, there remains a need in the automotive coatings art for composite coatings for direct-to-metal or polymer applications having good intercoat adhesion as well as good cratering and chipping resistance. Moreover, it would be advantageous to provide a coating system in which the powder basecoat is compatible with a wide variety of conventional liquid and powder slurry topcoats to lower VOC of the overall painting process yet minimize retrofit expenses for existing automotive coating assembly lines.

SUMMARY OF THE INVENTION

In one embodiment, the present invention provides a composite coated substrate comprising:
   (a) a substrate selected from the group consisting of metallic substrates, polymeric substrates and mixtures thereof;
   (b) a basecoat deposited upon a surface of the substrate, the basecoat being formed from a powder basecoating composition comprising:
      (i) at least one film-forming material comprising a thermosettable polyester and a curing agent;
      (ii) at least one reaction product of at least one cyclic carboxylic acid anhydride, at least one alkene and at least one reactant selected from the group consisting of primary amines, aliphatic polyamines, primary amino: alcohols, alcohols, isocyanates and mixtures thereof, the copolymer having a number average molecular weight ranging from about 1,000 to about 20,000; and
      (iii) at least one flow control agent; and
   (c) a topcoat deposited from a liquid or powder slurry topcoating composition applied over the basecoat to provide a composite coated substrate.

Another aspect of the present invention is a process for coating a metallic or polymeric substrate, comprising the steps of:
   (a) applying a powder basecoating composition to a surface of a metallic or polymeric substrate,
      the first powder basecoating composition comprising:
      (i) at least one film-forming material comprising a thermosettable polyester and a curing agent;
      (ii) at least one reaction product of at least one cyclic carboxylic acid anhydride, at least one alkene and at least one reactant selected from the group consisting of primary amines, aliphatic polyamines, primary amino alcohols, alcohols, is cyanates and mixtures thereof, the copolymer having a number average molecular weight ranging from about 1,000 to about 20,000; and
      (iii) at least one polymer flow control agent, to form a powder basecoat on the surface of the substrate;
   (b) at least partially curing the powder basecoat to form a basecoat;
   (c) applying a liquid or powder slurry topcoating composition over at least a portion of the basecoat; and
   (d) at least substantially curing the topcoating composition and any uncured basecoat to provide a composite coating upon the surface of the substrate.

Other than in the operating examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

DETAILED DESCRIPTION

The present invention relates to composite coated substrates useful as panels and parts, particularly for automotive applications, having striking visual effects, good gloss, durability, scratch and humidity resistance and is resistant to overspray incompatibility coating defects, such as cratering, chipping and lack of intercoat adhesion. The composite coating can be applied directly to metal and/or polymer substrates, eliminating the need for primer coatings. Alternatively, the composite coating can be applied over an electrodeposited primer coating or primer coating having less than 10 volume percent of weldable electroconductive pigment. The composite coating comprises a powder basecoating that is compatible with a wide variety of conventional liquid or powder slurry topcoats. Another advantage of the invention is the ability to produce these panels and parts using a virtually zero VOC basecoat system with high utilization rates.

The composite coated substrates of the present invention have a composite coating applied over at least a portion of a substrate. Suitable substrates are selected from the group consisting of metallic substrates, polymeric substrates, such as thermoset materials and thermoplastic materials, and combinations thereof.

Useful metal substrates include ferrous metals, non-ferrous metals, and combinations thereof. Suitable ferrous metals include iron, steel and alloys thereof. Non-limiting examples of useful steel materials include cold rolled steel, zinc coated steels such as hot dip galvanized and electrogalvanized steel, stainless steel, pickled steel, zinc-iron alloy such as GALVANEAL, zinc-aluminum alloys coated over steel such as GALVALUME, and GALFAN, and combinations thereof. It is possible for different portions of the same substrates to be different forms of ferrous metal, for example, for the zinc coating to be applied to only certain portions or one side of the steel substrate. Useful non-ferrous metals include aluminum, zinc, magnesium, and alloys thereof. Combinations or composites of ferrous and non-ferrous metals can also be used. Preferred metallic substrates are anticorrosive steels such as the zinc coated steels and the zinc-iron alloy and the zinc-aluminum alloys mentioned above.

Useful thermoset materials include polyesters, epoxides, phenolics, polyurethanes such as reaction injected molding urethane (RIM) thermoset materials and mixtures thereof. Useful thermoplastic materials include thermoplastic polyolefins such as polyethylene and polypropylene, polyamides such as nylon, thermoplastic polyurethanes, thermoplastic polyesters, acrylic polymers, vinyl polymers, polycarbonates, acrylonitrile-butadiene-styrene (ABS) copolymers, ethylene propylene diene monomer (EPDM) rubber, copolymers and mixtures thereof.

Preferably, the substrates are used as components to fabricate automotive vehicles, including but not limited to automobiles, trucks and tractors. The substrates can have any shape, but are preferably in the form of automotive body components such as bodies (frames), hoods, doors, fenders, bumpers and/or trim for automotive vehicles.

The present invention first will be discussed generally in the context of coating a metallic automobile body. One skilled in the art would understand that the process of the present invention also is useful for coating non-automotive metal and/or polymeric components, which will be discussed below.

Before depositing the coatings upon the surface of the metal substrate, it is preferred to remove dirt, oil, or foreign matter from the metal surface by thoroughly cleaning and degreasing the surface. The surface of the metal substrate can be cleaned by physical or chemical means, such as mechanically abrading the surface or cleaning/degreasing with commercially available alkaline or acidic cleaning agents which are well known to those skilled in the art, such as sodium metasilicate and sodium hydroxide. Non-limiting examples of suitable alkaline cleaning agents include CHEMKLEEN 163 and CHEMKLEEN 177 phosphate cleaners that are commercially available from PPG Industries, Inc. of Pittsburgh, Pa.

Following the cleaning step, the metal substrate is usually rinsed with water, preferably deionized water, in order to remove any residue. The metal substrate can optionally be dried using an air knife, by flashing the water off by brief exposure to a high temperature, or by passing the metal between squeegee rolls.

Following the cleaning and optional drying steps, the metal substrate may be optionally pretreated with a thin layer of pretreatment. The advantages of pretreatment include protection of the metallic substrate from corrosion and improvement of adhesion of subsequent coating layers to the substrate. Pretreatments may be chrome containing or preferably chrome-free. The choice of pretreatment is generally determined by the substrate and environmental considerations. Appropriate pretreatments are well known to those skilled in the art. An example of a suitable chrome pretreatment is Granodine 1415A available from Henkel Surface Technologies, NA. An example of a chrome-free pretreatment is Nupal 456BZ available from PPG Industries, Inc. or CHEMFOS 700 zinc phosphate pretreatment.

The pretreatment solution is applied to the surface of the metal substrate by any conventional application technique, such as spraying, immersion or roll coating in a batch or continuous process. The temperature of the treating solution at application is typically about 10° C. to about 85° C., and preferably about 15° C. to about 40° C. The pH of the preferred treating solution at application generally ranges from about 2.0 to about 9.0, and is preferably about 3 to about 5.

The film coverage of the residue of the pretreatment coating generally ranges from about 0.1 to about 1000 milligrams per square meter ($mg/m^2$), and is preferably about 1 to about 400 $mg/m^2$.

Hereafter, the term "substrate" shall refer to the cleaned, optionally pretreated, substrate.

Preferably, the surface of the substrate is essentially free of conductive weldable primer coating prior to application of the composite coating, i.e., the surface of the substrate has less than about 5 percent of its surface area coated with conductive weldable primer and more preferably less than about 2 percent. More preferably, the surface of the substrate is free of conductive weldable primer coating prior to application of the composite coating.

As used herein, "conductive weldable primer" or "conductive weldable primer coating" means a conductive, weldable coating, such as is described in U.S. Pat. No. 6,715,196 (incorporated by reference herein), that is formed from a composition comprising one or more electroconductive pigments which provide electroconductivity to the weldable coating and one or more binders which adhere the electroconductive pigment to the substrate. Such electroconductive pigments include zinc, iron phosphide, aluminum, iron, graphite, nickel, tungsten and mixtures thereof, such as Stolberger ZINCOLI as ZINCOLI S 620 zinc particles, US Zinc Superfine 7 zinc dust or Ferrophos Microfine grade 2132 iron phosphide from Glenn Springs Holdings of Lexington, Ky. Such a composition comprises a substantial amount of electroconductive pigment, generally greater than about 10 volume percent and usually about 30 to about 60 volume percent on a basis of total volume of electroconductive pigment and binder.

In another embodiment, the substrate can be coated with a powder primer, such as are disclosed in U.S. Pat. Nos. 4,804,581; 5,212,245 and 5,248,400 (incorporated by reference herein). Another example of a useful powder primer is ENVIROCRON PCV70118 powder primer available from PPG Industries, Inc.

In another embodiment, the surface of the substrate can be coated with an electrodeposited primer coating prior to application of the composite coating. Suitable electrodepositable coating compositions include conventional anionic or cationic electrodepositable coating compositions, such as epoxy or polyurethane-based coatings discussed in U.S. Pat. Nos. 6,217,674, 5,530,043; 5,760,107; 5,820,987 and 4,933,056, incorporated herein by reference. One skilled in the art would understand that such an electrodepositable coating composition is essentially free of electroconductive pigments, i.e., less than about 5 weight percent, preferably less than about 2 weight percent and more preferably is free of electroconductive pigments, on a basis of total weight of the electrodepositable coating composition, as such electroconductive materials would interfere with the electrodeposition process. Methods of application and suitable coating thicknesses are well known to those skilled in the art and are disclosed in the foregoing references.

To provide added cost savings, in another embodiment the surface of the substrate is essentially free of electrodeposited primer coating prior to application of the composite coating, i.e., the surface of the substrate has less than about 5 percent of its surface area coated with electrodeposited primer and more preferably less than about 2 percent. In another embodiment, the surface of the substrate is free of electrodeposited primer coating prior to application of the composite coating.

An advantage of the composite coating of the present invention is that it can be applied directly to bare metal, eliminating the need for primer coating. Besides the obvious cost savings of eliminating a coating layer and saving energy by eliminating a drying step, elimination of electrodeposition of primer coating can significantly reduce plant infrastructure expense. Preferably, the bare metal is cold-rolled steel or galvanized steel.

In the present invention, a basecoat is deposited upon a surface of the substrate. The basecoat is formed from a powder basecoating composition comprising at least one film-forming material.

Preferably, the polymeric, film-forming material of the powder basecoating composition is of the thermoset type and comprises: (a) one or more polymers having reactive functional groups and; (b) one or more curing agents selected to react with the functional groups of (a).

At least one of the polymers (a) having reactive functional groups is a thermosettable polyester. The thermosettable polyester can have reactive functional groups selected from the group consisting of hydroxyl, carboxylic acid, epoxy, carbamate, amide, carboxylate and combinations thereof.

Preferably, the thermosettable polyester has carboxylic acid functionality. Monomers for the synthesis of polyester polymers having carboxylic acid functionality suitable for use in the powder coating compositions of the present invention are chosen such that the resulting polyester polymer has a $T_g$ greater than 40° C.

Among the carboxylic acid group-containing polyesters which may be used are those based on a condensation reaction of aliphatic polyols, including cycloaliphatic polyols, with aliphatic and or aromatic polycarboxylic acids and anhydrides. Examples of suitable aliphatic polyols include 1,2-ethanediol, 1,3-propanediol, 1,4-butanediol, 1,6-hexanediol, neopentyl glycol, cyclohexane dimethanol, trimethylolpropane, and the like. Suitable polycarboxylic acids and anhydrides include succinic acid, adipic acid, azelaic acid, sebacic acid, terephthalic acid, isophthalic acid, tetrahydrophthalic acid, hexahydrophthalic acid, trimellitic acid, and anhydrides of such acids.

The polyol and the acid or anhydride are reacted together with an excess of acid over alcohol so as to form a polyester which has free carboxylic groups. Preferably, the carboxylic acid group-containing polyester will have an acid number of from about 20 to about 80, more preferably from about 30 to about 75, and will be an amorphous solid at room temperature. The polyester is further characterized as having a $T_g$ of from about 30° C. to about 85° C., preferably from about 40° C. to about 75° C.

The $T_g$ of a polymer is a measure of the hardness and melt flow of the polymer. The higher the $T_g$, the less the melt flow and the harder the coating. $T_g$ is described in Principles of Polymer Chemistry (1953), Cornell University Press. The $T_g$ can be actually measured or it can be calculated as described by Fox in Bull. Amer. Physics Soc., 1, 3, page 123 (1956). $T_g$, as used herein, refers to actually measured values. For measurement of the $T_g$ of a polymer, differential scanning calorimetry (DSC) can be used (a rate of heating of 10° C. per minute, with $T_g$ taken at the first influxation point).

If the $T_g$ of the polyester is below 30° C., the polymer and a powder coating composition including such a polymer can tend to be sticky and difficult to handle. If the $T_g$ is above 85° C., the melt flow of the polyester is low and the coating may have poor appearance.

Examples of suitable carboxylic acid group-containing polyester polymers are those described in U.S. Pat. No. 4,801,680 at col. 5, line 65 to col. 7, line 39, hereby incorporated by reference. A preferred carboxylic acid functional polyester is DSM P880, which is available from DSM.

In addition to the thermosettable polyester, the powder basecoating composition can further comprise other oligomers or polymers containing functional groups such as hydroxyl, carboxylic acid, epoxy, carbamate, amide and carboxylate functional groups.

The use in powder coatings of acrylic, polyester, polyether and polyurethane oligomers and polymers having hydroxyl functionality is well known in the art. Monomers for the synthesis of such oligomers and polymers are chosen such that the resulting oligomers and polymers have a $T_g$ greater than 40° C. Examples of such oligomers and polymers having hydroxyl functional groups suitable for use in the powder coating compositions of the present invention are those described in U.S. Pat. No. 5,646,228 at column 5, line 1 to column 8, line 7, incorporated by reference herein.

The use in powder coatings of acrylic polymer shaving carboxylic acid functionality is well known in the art. Monomers for the synthesis of the acrylic polymers having carboxylic acid functionality suitable for use in the powder coating compositions of the present invention are chosen such that the resulting acrylic polymer has a $T_g$ greater than 40° C. Examples of carboxylic acid group containing acrylic polymers are those described in U.S. Pat. No. 5,214,101 at col. 2, line 59 to col. 3, line 23, incorporated by reference herein.

Also useful in powder coating compositions are acrylic, polyester and polyurethane polymers containing carbamate functional groups and epoxy functional groups, such as those well known in the art. Examples of such polymers having carbamate functionality suitable for use in the powder coating compositions of the invention are described in international application WO 94/10213. Examples of polymers having epoxy functionality suitable for use in powder coating compositions are described in U.S. Pat. No. 5,407,707, incorporated by reference herein. Monomers for the synthesis of such polymers for use in the powder coating compositions are chosen such that the resulting polymer has a high $T_g$, that is, a $T_g$ greater than 40° C.

Suitable curing agents for the powder basecoating composition include aminoplasts, blocked polyisocyanates, polyacids, polyepoxides, polyols, polyanhydrides, hydroxyalkylamides, and mixtures thereof.

Blocked isocyanates as curing agents for (OH) and primary and/or secondary amino group containing materials are well known in the art. Examples of blocked isocyanates suitable for use as curing agents in the powder coating compositions of the present invention are those described in U.S. Pat. No. 4,988,793, col. 3, lines 1 to 36, incorporated by reference herein.

Polyepoxides as curing agents for (COOH) functional group containing materials are well known in the art. Examples of polyepoxides suitable for use as curing agents in the powder coating compositions of the present invention are those described in U.S. Pat. No. 4,681,811 at col. 5, lines 33 to 58, incorporated by reference herein.

Polyacids as curing agents for epoxy functional group containing materials are well known in the art. Examples of polyacids suitable for use as curing agents in the powder coating compositions of the present invention are those described in U.S. Pat. No. 4,681,811 at col. 6, line 45 to col. 9, line 54, incorporated by reference herein.

Polyols, that is, material having an average of two or more hydroxyl groups per molecule, can be used as curing agents for (NCO) functional group containing materials and anhydrides, and are well known in the art. Polyols for use in the powder coating compositions of the present invention are selected such that the resultant material has a high glass transition temperature, i.e., greater than 50° C.

Beta-hydroxyalkylamide materials as crosslinkers for carboxylic acid-functional polymers (a) are disclosed in U.S. Pat. No. 4,801,680, incorporated by reference herein. The hydroxyl functionality of the beta-hydroxyalkylamide should be on an average basis at least two, preferably greater than two, and more preferably from greater than two up to about four in order to obtain optimum curing response.

The beta-hydroxyalkylamide materials can be depicted structurally as follows:

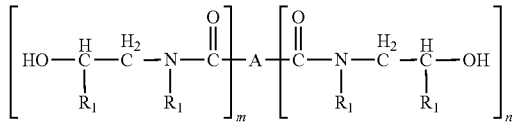

wherein $R_1$ is H or $C_1$-$C_5$ alkyl; $R_2$ is H, $C_1$-$C_5$ alkyl or:

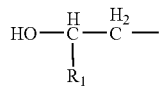

wherein $R_1$ is as described above; A is a bond, monovalent or polyvalent organic radical derived from a saturated, unsaturated or aromatic hydrocarbon including substituted hydrocarbon radicals containing from 2 to 20 carbon atoms, m is equal to 1 to 2, n is equal to 0 or 2, and m+n is at least 2, preferably greater than 2, usually within the range of from 2 up to and including 4. Preferably, A is an alkylene radical —$(CH_2)_x$— where x is from 2 to 12, preferably from 4 to 10. A preferred beta-hydroxyalkylamide is N,N,N',N'-tetrakis(2-hydroxyethyl) adipamide commercially available from Ems-Chemie AG, Switzerland under the trade name, PRIMID XL-552.

The beta-hydroxyalkylamide can be prepared by reacting a lower alkyl ester or mixture of esters of carboxylic acids with a beta-hydroxyalkylamine at a temperature ranging from ambient temperature up to about 200° C., depending on the choice of reactants and the presence or absence of a catalyst. Suitable catalysts include base catalysts such as sodium methoxide, potassium methoxide, sodium butoxide, potassium butoxide sodium hydroxide, potassium hydroxide and the like, present in amounts of about 0.1 to about 1 percent by weight based on the weight of the alkyl ester.

To bring about the most effective cure of the powder coating composition, the equivalent ratio of beta-hydroxyalkylamide (hydroxy equivalents) to carboxy-containing polyester (carboxylic acid equivalents) is preferably from about 0.6 to 1.6:1, more preferably from 0.8 to 1.3:1. Ratios outside the range of 0.6 to 1.6:1 are undesirable because of poor cure.

Anhydrides as curing agents for epoxy functional group containing materials are well known in the art. Examples of such curing agents include trimellitic anhydride, benzophenone tetracarboxylic dianhydride, pyromellitic dianhydride, tetrahydrophthalic anhydride, and the like as described in U.S. Pat. No. 5,472,649 at col. 4, lines 49 to 52, incorporated by reference herein.

Aminoplasts as curing agents for OH, COOH and carbamate functional group containing materials are well known in the art. Examples of such curing agents suitable for use in the present invention are aldehyde condensates of glycoluril, which give high melting crystalline products useful in powder coatings. While the aldehyde used is typically formaldehyde, other aldehydes such as acetaldehyde, crotonaldehyde, and benzaldehyde can be used.

The powder basecoating composition comprises at least one reaction product of at least one cyclic carboxylic acid anhydride, at least one alkene and at least one reactant selected from the group consisting of primary amines, aliphatic polyamines, primary amino alcohols, alcohols, isocyanates and mixtures thereof. The copolymer has a number average molecular weight ranging from about 1,000 to about 20,000, preferably about 3,000 to about 10,000, and more preferably about 3,000 to about 6,000, and most preferably about 2,000 to about 2,500.

Non-limiting examples of suitable cyclic carboxylic acid anhydrides include maleic anhydride (preferred), chloromaleic anhydride, dichloromaleic anhydride, bromomaleic anhydride, citraconic anhydride, dimethylmaleic anhydride, ethylmaleic anhydride, itaconic anhydride, vinylsuccinic anhydride and vinyl trimellitate anhydride.

Suitable alkenes include cycloalkenes, alpha olefins, vinyl monomers, esters of acrylic acid or methacrylic acid, and mixtures thereof.

Examples of suitable alpha olefins include 1-hexene, 1-heptene, 1-octene, 1-nonene, 1-decene (preferred), 2-methyl-1-butene, 2-ethyl-1-butene, 2-ethyl-1-pentene, 2-methyl-1-pentene and 2-ethyl-1-hexene.

The reaction product can be considered an essentially alternating copolymer of the cyclic carboxylic acid anhydride and alkene. Theoretically, one mole of the cyclic carboxylic acid anhydride or substituted cyclic carboxylic acid anhydride is added to one mole of the alkene to obtain the copolymer. However, a molar excess of the alkene over the cyclic carboxylic acid anhydride is preferably employed. The reaction is carried out by heating the reactants together, preferably in the presence of an organic solvent and in the presence of a free radical initiator, e.g., an organic peroxide such as tertiary amyl peroxyacetate, tertiary butyl perbenzoate and the like, or an azo compound such as azobisisobutyronitrile and the like at a temperature generally up to the reflux of the alkene, generally temperatures from about 30° C. to about 220° C., preferably from about 80° C. to 180° C. for a time sufficient to complete the copolymerization, generally, a period of time varying between 1 to 24 hours, preferably 1 to 3 hours. The organic peroxide free radical initiators are preferred.

The reaction product generally has a number average molecular weight of from about 1,000 to about 20,000, preferably from about 3,000 to about 10,000, and more preferably from 3,000 to 6,000. The number average molecular weight of the copolymers can be determined by gel permeation chromatography (GPC) using a polystyrene standard. By such method, it is not the actual molecular weight that is measured but an indication of the molecular weight as compared to polystyrene. The values that are obtained are commonly referred to as polystyrene numbers, however, for the purposes of this application, they are referred to as molecular weights. Molecular weights (number average) less than 1,000 are undesirable as the copolymer loses surface activity, i.e., loss of flow control properties, whereas molecular weights greater than about 10,000 are less desirable and greater than about 20,000 are undesirable because of detrimental flow properties due to high viscosity.

The reaction product is chemically modified by from about 0.5 to about 100 mole percent of a reactant selected from the group consisting of primary amines, aliphatic polyamines, primary amino alcohols, alcohols, isocyanates and mixtures thereof, based on moles of the anhydride functional groups in the copolymer. Preferably, the reaction product is chemically modified by from about 2 to about 10 mole percent of the reactant discussed above.

Chemical modification with an alcohol forms the partial ester or half ester derivatives, while chemical modification with a primary amine forms the imide. Among the alcohols that can be used are alkanols, preferably alkanols containing from 1 to about 10 carbon atoms such as methanol, ethanol, propanols, butanols, pentanols, hexanols, heptanols, octanols and the like. More preferably, the alkanol is methanol, ethanol, butanol, or 2-ethylhexanol. Aryl alkanols, such as benzyl alcohol, phenethyl alcohol and phenyl propyl alcohol, alkylglycols, such as, ethylene glycol or propylene glycol, and substituted alkyl glycols, such as, the monoethylether of ethylene glycol, monobutylether of ethylene glycol, and monohexylether of ethylene glycol can also be suitable alcohols to form the half esters of the anhydride groups. The alcohols may also be a tertiary amine having at least one alkanol radical such as 2-dimethylaminoethanol, 1-diemthylaminomethylpropanol, 2-diethylaminoethanol and the like, or a diglycol amine, such as dimethyl or diethyl (amino ethoxy) ethanol. Chemical modification, i.e., esterification, by an alcohol can be accomplished by heating the copolymer and the alcohol together at a temperature of 100° C. to 150° C., optionally using a catalyst, such as sodium methoxide, to expedite the anhydride ring opening.

The copolymer can also be chemically modified with primary amines, such as butylamine, isobutylamine, propylamine, isopropylamine, ethylamine, methylamine and pentylamine, aliphatic polyamines, such as N,N-dimethylaminopropylamine, N,N-dimethylaminoethylamine, N,N-diethylaminopropylamine, N,N-diethylaminoethylamine and the like, or primary aminoalcohols such as ethanolamine (preferred) and propanolamine and the like. Primary amines, such as aliphatic polyamines, e.g., N,N-dimethylaminopropylamine, yield an imide-modified anhydride with pendent tertiary amino groups, which may act as a catalyst for epoxy reactions, and increase the crosslink density and resistance properties of the cured coating. Primary aminoalcohols can yield an imide-modified anhydride with pendent alcohol functionality.

Examples of suitable isocyanates include alkyl-substituted isocyanates such as MONDUR O octadecyl isocyanate.

Preferably, the reaction product is prepared from 1-decene, maleic anhydride, monoethanol amine and octadecyl isocyanate, has an acid value ranging from about 8 to about 15 and a number average molecular weight ranging from about 2,000 to about 2,500.

Generally, the powder basecoating composition comprises from about 50 to about 85 percent by weight of film-forming material and from about 70 to about 80 percent by weight of the reaction product. Preferably, the reaction product will be included in the powder basecoating composition from about 0.1 to about 5 percent by weight, more preferably, from about 0.5 to about 3 percent by weight on the basis of the total weight of film-forming material and reaction product.

The powder basecoating composition comprises at least one flow control agent. Suitable as flow control agents are acrylic polymers (preferred), such as polylauryl acrylate, polybutyl acrylate, poly(2-ethylhexyl) acrylate, poly(ethyl-2-ethylhexyl) acrylate, polylauryl methacrylate, polyisodecyl methacrylate and the like, and fluorinated polymers such as esters of polyethylene glycol or polypropylene glycol with fluorinated fatty acids, e.g., an ester of polyethylene glycol having a molecular weight over about 2,500 and perfluorooctanoic acid. Polymeric siloxanes with molecular weights over 1,000 may also be used as a flow control agent, for example, polydimethylsiloxane or poly(methylphenyl)siloxane. The flow control agents can aid in reduction of surface tension during heating of the powder and in eliminating crater formation. Preferably, the flow control agent is an acrylic copolymer prepared from 2-ethylhexyl acrylate and butyl acrylate, such as RESIFLOW PL200 available from Estron Chemical of Calvert City, Ky. Generally, the flow control agent is present in amounts from about 0.05 to about 5 percent by weight based on the total weight of the powder coating composition.

The powder base coating composition further comprises at least one visual effect additive, such, as flake or plate pigments, or metallized polymeric particles. Examples of flake pigments include aluminum flake pigments such as Silberline TF4700/LE10521 aluminum flake. Other metal flake compositions may be used such as bronze flake, stainless steel flake, nickel flake, tin flake, silver flake, copper flake and the like. Preferred flake pigments range from 1.0 to 50.0 micron in size. In addition to the flake pigments described, other metallized polymeric particles, such as aluminized Mylar and aluminized polyester fibers, may be used. Other suitable pigments include micas, coated micas, iron oxides, lead oxides, carbon black, titanium dioxide and colored organic pigments such as phthalocyanines. Suitable metal oxides used as coatings on mica particles can comprise aluminum oxides or other metal oxides such as titanium dioxide, ferric oxide, chromium hydroxide, and the like and combinations thereof. Other useful pigments include HELICONE HC silicone liquid crystal platelets.

The specific pigment to binder ratio can vary widely so long as it provides the requisite hiding at the desired film thickness and application solids. The pigment is incorporated into the powder coating at a level of 0.1% to 20.0% based on the total weight of the powder coating. Preferably, the amount of flake pigment is between 1.0% and 10.0% based on total weight of the coating composition.

In order for the attractive visual effects caused by the orientation of the flake pigment in the resultant coating to be realized, the flake pigment particles are incorporated into the powder coating by dry blending rather than extrusion. The dry blending operation can be conducted with cooling or with heating. Dry blending with heat is referred to as "bonding". The bonding method is believed to attach the flake pigment to the binder particles, but not to actually disperse the flake pigment in the binder powder particles. The "bonding"

method of dispersion is particularly useful in the dispersion of metal flake particles since it eliminates the undesirable electrostatic effects that occur in the electrostatic spraying of metallic particles.

In addition to the colored flake pigments, one or more additional non-flake pigments can be included in the coating composition typically in amounts from about 1 to about 50 percent by weight, based on the total weight of the powder coating composition. Pigments which are suitable for powder coating compositions may be organic or inorganic and include basic lead silica chromate, titanium dioxide, ultramarine blue, phthalocyanine blue, phthalocyanine green, carbon black, black iron oxide, chromium green oxide, ferrite yellow and quinto red.

Anti-popping agents can be added to the compositions to allow any volatile material present to escape from the film during baking. Benzoin and/or zinc oxide are preferred degassing agents and when used is present amounts ranging from about 0.5 to about 3 percent by weight based on total weight of the powder basecoating composition. The powder coating compositions may also preferably contain UV absorbing agents, such as TINUVIN, which when used are typically present in the compositions in amounts of about 0.5 to about 6 percent by weight based on the total weight of the powder basecoating composition.

In addition, the powder basecoating composition may contain fumed silica or the like as a powder flow additive to reduce caking of the powder during storage. An example of fumed silica is sold by Cabot Corporation under the trademark CAB-O-SIL®. The powder flow additive, when used, is generally present in amounts ranging from about 0.1 to about 0.5 percent by weight based on the total weight of the powder basecoating composition. The powder flow additive is generally added to the particulate powder basecoating composition after preparation of the particulate mixture.

The powder coatings compositions are typically prepared by blending the polymers containing the functional groups, crosslinking agents (for thermosetting compositions) and optional ingredients for 15 minutes in a Henschel blade blender. The powder is then usually extruded such as through a Baker-Perkins twin-screw extruder. The extrudate is particulized typically by first chipping into flake and then milling in a hammer mill. The finished powder can be then classified to a particle size of usually between 20 and 30 micrometers in a cyclone grinder/sifter.

An example of a suitable powder basecoat is ENVIROCRON PZB53100 powder base coat available from PPG Industries, Inc.

The colored powder coating can be applied by electrostatic spraying or by the use of a fluidized bed. Electrostatic spraying using a gun or bell at 55 to 80 kV, 80 to 120 grams or more per minute is preferred. The powder basecoating composition can be applied in one pass or in several passes to provide a film thickness after cure of about 12.7 to about 102 micrometers (0.5 to about 4 mils). Preferred coating thickness is such that good chip resistance, U.V. opacity, and visual hiding are realized. Preferred film thickness is 51 to 102 micrometers (2 to 4 mils). The substrate to be coated can optionally be preheated prior to application of the powder to promote a more uniform powder deposition.

After application of the color powder basecoating to the substrate, the substrate is heated to a temperature sufficient to melt and coalesce the coating. This is an important step in the present invention because when done correctly the flake pigment migrates to the air interface and aligns itself in a substantially parallel direction to the substrate, resulting in a distinctive, visually pleasing appearance. The heating step should be conducted such that the color powder coating coalesces to a substantially continuous fluid layer, but not so high as to cause viscosity increase and crosslinking of the coating before the flake pigment rises to the coating-air interface and aligns with the coating surface. The layer is maintained in the fluid state for a period of time sufficient for the flake pigment to rise to the coating-air interface and to align so that the two largest dimensions of the pigment flake are almost parallel with the coating surface. After the pigment has aligned itself with the coating surface, the coating may continue to be heated until, in the case of thermoset powder basecoats, partial or complete cure is accomplished. Alternatively, the coating may be cooled prior to cure. Typically, the color coat is heated to a temperature between about 110° C. and about 190° C. for a period of about 4 to about 40 minutes. When a heat curable thermosetting clear coat is used, the color coat does not have to be completely cured and complete cure can occur during the cure cycle of the thermosetting clear coat.

A topcoat is deposited over the basecoat and cured to provide the composite coated substrate of the present invention. The topcoat can be liquid or powder slurry (powder suspended in a liquid), as desired. Preferably, the topcoating composition is a crosslinkable coating comprising one or more thermosettable film-forming materials and one or more crosslinking materials such as are discussed above. Useful film-forming materials include epoxy-functional film-forming materials, acrylics, polyesters and/or polyurethanes. The topcoating composition can include additives such as are discussed above for the basecoat, but preferably not pigments. If the topcoating is a liquid or powder slurry, volatile material(s) are included. Suitable waterborne topcoats are disclosed in U.S. Pat. No. 5,098,947 (incorporated by reference herein) and are based on water soluble acrylic resins. Useful solvent borne topcoats are disclosed in U.S. Pat. Nos. 5,196,485 and 5,814,410 (incorporated by reference herein) and include epoxy-functional materials and polyacid curing agents. An example of a useful solvent borne topcoats is DIAMOND COAT DCT5555 solvent borne clearcoating composition available from PPG Industries, Inc. Suitable powder slurry topcoating compositions include those disclosed in International Publications WO 96/32452 and 96/37561, European Patents 652264 and 714958, and Canadian Pat. No. 2,163,831, which are incorporated by reference herein.

The amount of the topcoating composition applied to the substrate can vary based upon such factors as the type of substrate and intended use of the substrate, i.e., the environment in which the substrate is to be placed and the nature of the contacting materials. Generally, the topcoating composition is applied to provide a film thickness after cure of about 12.7 to about 102 micrometers (0.5 to about 4 mils), preferably about 38.1 to about 68.6 micrometers (1.5 to about 2.7 mils). Typically, the topcoat is heated to a temperature between about 110° C. and about 190° C. for a period of about 4 to about 40 minutes.

Another aspect of the present invention is a process for coating a metallic or polymeric substrate, comprising the steps of: (a) applying the powder basecoating composition discussed above to a surface of a metallic or polymeric substrate, to form a powder basecoat on the surface of the substrate; (b) at least partially curing the powder basecoat to form a basecoat; (c) applying a liquid or powder slurry topcoating composition over at least a portion of the basecoat; and (d) at least substantially curing the topcoating composition and any uncured basecoat to provide a composite coating upon the surface of the substrate.

As used herein, the term "cure" as used in connection with a composition, e.g., "composition when cured," and "thermoset" as used in connection with a composition, e.g. "thermoset composition" shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety, of methods, such as dynamic mechanical thermal analysis (DMTA) using a TA Instruments DMA 2980 DMTA analyzer conducted under nitrogen. This method determines the glass transition temperature and crosslink density of free films of coatings or polymers. These physical properties of a cured material are related to the structure of the crosslinked network.

The thickness of the sintered and crosslinked composite coating is generally about 0.2 to about 5 mils (5 to 125 micrometers), and preferably about 0.4 to about 4 mils (10 to 100 micrometers). The composite coating is cured such that any crosslinkable components of the coating are crosslinked to such a degree that the automobile industry accepts the coating process as sufficiently complete to transport the coated automobile body without damage to the coating.

Illustrating the invention are the following examples which, however, are not to be considered as limiting the invention to their details. Unless otherwise indicated, all parts and percentages in the following examples, as well as throughout the specification, are by weight.

EXAMPLES

The following examples show the preparation of a coated panel by the method of the present invention using a cleaned and pretreated galvanized substrate (optionally coated with an electrodeposited primer), powder color coat and liquid clearcoat. For the purpose of comparison, a panel was coated by a conventional method using an electrodeposited primer, a liquid color coat and a liquid clearcoat. The coated panels were compared for various properties as shown in the Tables that follow.

Preparation of Pretreated Panels

Two-sided hot dipped GALVANEAL panels from USX Corporation, 15.3 centimeters (cm) wide and 38.1 centimeters (cm) long, were cleaned in a spray tank with CHEMKLEEN 163 cleaner solution (CHEMKLEEN 163 concentrate dissolved in tap water at a concentration of 2% on a volume basis) for 2 minutes at 60° C. (135-145° F.). The panels were rinsed with deionized water and dried with a warm air blower. The time duration of the cleaning step was adjusted to cause the rinse water to drain from the vertical surface of the metal panel in a sheet with no breaks in the water, thus indicating an oil-free surface. The cleaned panels were then pretreated with CHEMPHOS C700/C59 Zinc phosphate composition on both sides and then rinsed with deionized water and dried with a warm air blower. The dried panels were wrapped in paper and stored under ambient room conditions.

Preparation of Electrodeposited Coated Panels

ED6100H electrodepositable primer (available from PPG Industries, Inc.) was applied by electrodeposition to selected pretreated panels and the panels were baked for 20 minutes at 177° C. (350° F.) to provide a film thickness of 20 to 30 micrometers (0.8 to 1.2 mils).

Example A

Preparation of GALVANEAL Powder Base Coat/Liquid Clear Coat

Example A1

ENVIROCRON PZB53100 powder base coat containing colored mica pigment (available from PPG Industries, Inc.) was applied to the pretreated panels by electrostatic spray and the panels were baked for 30 minutes at 172° C. (340° F.) in an electric box oven and allowed to air cool to provide a film thickness of 43 to 70 micrometers (1.7 to 2.8 mils).

The ENVIROCRON PZB53100 powder base coat included carboxylic acid functional polyester resin, beta hydroxy alkylamide crosslinker, acrylate copolymer, reaction product as described below, degassing agents, antioxidant, UV absorber and pigments.

The reaction product was prepared by the following method. A reaction vessel fitted with a condenser, thermometer, nitrogen sparging inlet and agitator was charged with 61.1 parts by weight (ppw) of 1-decene dissolved in 73.8 ppw of butyl acetate. The 1-decene solution was heated to a reflux temperature at 145° C. and a mixture of 1.8 ppw of tertiary-amyl peroxyacetate (60% by weight in mineral spirits) available as LUPERSOL 555-M60 and 62.7 ppw of butyl acetate was added over a period of about three hours. A solution of 27.4 ppw of maleic anhydride in 98.8 ppw of butyl acetate was added over a period of about two hours. The reaction mixture was thinned with an additional 85.5 ppw of butyl acetate followed by heating at reflux for one hour. Monoethanolamine (16.2 ppw) and 16.2 ppw of butyl acetate were added to the reaction mixture and the reaction mixture heated to reflux and water removed by azeotropic distillation when the water content of the reaction mixture was reduced to less than 0.2% by weight. The temperature of the reaction mixture was set to 115° C. and 1.6 ppw of octadecyl isocyanate dissolved in 30.0 ppw of butyl acetate was added to the reaction mixture. The reaction mixture was maintained at 115° C. until there was no evidence of NCO by IR analysis. Thereafter, solvent was removed by distillation until the reaction mixture reached a solids content of 65% by weight.

After application of the powder basecoat as described above, DIAMOND COAT DCT5555 solvent borne clear composition (available from PPG Industries, Inc.) was then applied to the powder base coat by spray application and was baked for 30 minutes at 141° C. (285° F.) to provide a film thickness of 38 to 64 micrometers (1.5 to 2.6 mils).

Alternately

Example A2

ENVIROCRON PZB53100 powder base coat containing colored mica pigment was applied to the pretreated panels by electrostatic spray and the panels were baked for 19 minutes at 143° C. (290° F.) in an electric box oven and allowed to air cool to provide a film thickness of 43 to 70 micrometers (1.7 to 2.8 mils).

DIAMOND COAT DCT5555 solvent borne clear composition was then applied to the powder base coat by spray application and was baked for 30 minutes at 169° C. (335° F.) to give a film thickness of 38 to 64 micrometers (1.5 to 2.6 mils).

Example B

Preparation of GALVANEAL/Electrodeposited Primer/Powder Base Coat/Liquid Clear Coat

Example B1

ENVIROCRON PZB53100 powder base coat containing colored mica pigment was applied to the electrodeposited primer panels by electrostatic spray and the panels were baked for 30 minutes at 172° C. (340° F.) in an electric box oven and allowed to air cool to give a film of 43 to 70 micrometers (1.7 to 2.8 mils).

DIAMOND COAT DCT5555 solvent borne clear composition was then applied to the powder base coat by spray application and was baked for 30 minutes at 141° C. (285° F.) to give a film thickness of 38 to 64 micrometers (1.5 to 2.6 mils).

Alternately

Example B2

ENVIROCRON PZB53100 powder base coat containing colored mica pigment was applied to the electrodeposited primer panels by electrostatic spray and the panels were baked for 19 minutes at 143° C. (290° F.) in an electric box oven and allowed to air cool to give a film of 43 to 70 micrometers (1.7 to 2.8 mils).

DIAMOND COAT DCT5555 solvent borne clear composition was then applied to the powder base coat by spray application and was baked for 30 minutes at 169° C. (335° F.) to give a film thickness of 38 to 64 micrometers (1.5 to 2.6 mils).

Control (Comparative)

Preparation of Control Panels Coated with Conventional Liquid. System

Liquid Waterborne HWB190430 basecoat containing colored mica pigment (available from PPG Industries Inc.) was applied to the electrodeposited primer panels by spray application and the panels were baked for 10 minutes at 121° C. (250° F.) in an electric box oven and allowed to air cool to give a film of 20 to 38 micrometers (0.8 to 1.5 mils).

DIAMOND COAT DCT5555 solvent borne clear composition was then applied to the powder base coat by spray application and was baked for 30 minutes at 141° C. (285° F.) to give a film thickness of 38 to 64 micrometers (1.5 to 2.6 mils).

Comparison of Panels

The following tables show a direct comparison of panels coated by the method of the present invention (Examples A and B) and panels coated with a commercial paint system (Control). The panels prepared by the process of the present invention are generally equal to those of the control with respect to the following automotive test properties: 20° gloss (ASTM D523-89), chip resistance (ASTM 3170-03), scratch resistance (Chrysler Test LP-463-PB-54-01 crock-mar test: 20° gloss retention), Dry cross-hatch adhesion (ASTM D3359 Method A), humidity resistance (ASTM D1735-02 for 240 hrs at 100° F. and 100% relative humidity), durability (24 months Florida Exposure, SAE J1976) and salt spray corrosion resistance (ASTM B117-95).

TABLE 1

| | Example A | Control |
|---|---|---|
| Primer Layer | None | ED6100H |
| Base Coat | ENVIROCRON Powder PZB53100 | Liquid-Waterborne HWB190430 |
| Clear Coat | DIAMOND COAT DCT5555 | DIAMOND COAT DCT5555 |

| | Example A1 | Example A2 | Control |
|---|---|---|---|
| Base Coat Bake | Full Bake 30' @ 340° F. | Flash Bake 19' @ 295° F. | Flash Bake 10' @ 250° F. |
| Clear Coat Bake | Normal Bake 30' @ 285° F. | High Bake 30' @ 335° F. | Normal Bake 30' @ 285° F. |
| 20° Gloss ASTM D523-89 | 80-95 | 80-95 | 80-95 |
| Chip Resistance ASTM 3170-03 (Scale: 1 = poor/10 = excellent) | 7-8 | 7-8 | 7-8 |
| Scratch Resistance Chrysler Test LP-463-PB-54-01 (crock-mar test: 20° gloss retention) | 60-70% | 65-75% | 60-70% |
| Adhesion ASTM D3359 Method A Dry crosshatch adhesion | 100% | 100% | 100% |
| Humidity resistance ASTM D1735-02 (240 hrs 100° F. 100% relative humidity) | 100% Adhesion No Blisters No Blush No Cracking | 100% Adhesion No Blisters No Blush No Cracking | 100% Adhesion No Blisters No Blush No Cracking |
| Durability (24 months Florida Exposure) SAE J1976 | | | |
| % 20° gloss Retention | 80-88 | 80-88 | 80-88 |
| Blister/Blush | None/None | None/None | None/None |
| Acid Etch | Slight-Moderate | V. Slight-Slight | Slight-Moderate |
| Corrosion Resistance: ASTM B117-95 Salt Spray | | | |
| 500 hrs Salt Spray | | | |
| Scribe Creep (mm) | 3-6 mm | 3-6 mm | 2-6 mm |
| Blister Size/Density | Very Small/Very Few | Very Small/Very Few | Very Small/Very Few |

TABLE 1

| | Example B | Control |
|---|---|---|
| Base Coat | ENVIROCRON Powder PZB53100 | Liquid-Waterborne HWB190430 |
| Clear Coat | DIAMOND COAT DCT5555 | DIAMOND COAT DCT5555 |

| | Example B1 | Example B2 | Control |
|---|---|---|---|
| Base Coat Bake | Full Bake 30' @ 340° F. | Flash Bake 19' @ 295° F. | Flash Bake 10' @ 250° F. |
| Clear Coat Bake | Normal Bake 30' @ 285° F. | High Bake 30' @ 335° F. | Normal Bake 30' @ 285° F. |
| 20° Gloss ASTM D523-89 | 80-95 | 80-95 | 80-95 |
| Chip Resistance ASTM 3170-03 (Scale: 1 = poor/10 = excellent) | 7-8 | 7-8 | 7-8 |
| Scratch Resistance Chrysler Test LP-463-PB-54-01 (crock-mar test: 20° gloss retention) | 60-70% | 65-75% | 60-70% |
| Adhesion ASTM D3359 Method A Dry crosshatch adhesion | 100% | 100% | 100% |
| Humidity resistance | 100% Adhesion | 100% Adhesion | 100% Adhesion |
| ASTM D1735-02 (240 hrs 100° F. | No Blisters No Blush | No Blisters No Blush | No Blisters No Blush |

TABLE 1-continued

| | | | |
|---|---|---|---|
| 100% relative humidity) | No Cracking | No Cracking | No Cracking |
| Durability (24 months Florida Exposure) SAE J1976 | | | |
| % 20° gloss Retention | 80-88 | 80-88 | 80-88 |
| Blister/Blush | None/None | None/None | None/None |
| Acid Etch | Slight-Moderate | V. Slight-Slight | Slight-Moderate |
| Corrosion Resistance: ASTM B117-95 Salt Spray | | | |
| 500 hrs Salt Spray | | | |
| Scribe Creep (mm) | 2-6 mm | 2-6 mm | 2-6 mm |
| Blister Size/Density | Very Small/Very Few | Very Small/Very Few | Very Small/Very Few |

The above comparative examples show that the coating system of Example B of the present invention compares very favorably with the conventional coating system in the physical property tests set forth above. The coating system of the present invention can be used with or without electrodeposited primer, which provides greater flexibility than the conventional coating process, particularly with regards to capability, efficiency and cost.

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

I claim:

1. A composite coated substrate comprising:
    (a) a substrate selected from the group consisting of metallic substrates, polymeric substrates and combinations thereof, wherein a surface of the substrate is essentially free of a primer coating;
    (b) a basecoat deposited upon the surface of the substrate, the basecoat being formed from a powder basecoating composition comprising:
        (i) at least one film-forming material comprising a thermosettable polyester and a curing agent;
        (ii) at least one reaction product of at least one cyclic carboxylic acid anhydride, at least one alkene and at least one reactant selected from the group consisting of primary amines, aliphatic polyamines, primary amino alcohols, alcohols, isocyanates and mixtures thereof, the copolymer having a number average molecular weight ranging from about 1,000 to about 20,000; and
        (iii) at least one flow control agent; and
    (c) a topcoat deposited from a liquid or powder slurry topcoating composition applied over the basecoat to provide a composite coated substrate.

2. The composite coated substrate according to claim 1, wherein the primer coating is a weldable primer coating.

3. The composite coated substrate according to claim 1, wherein the primer coating is an electrodeposited primer coating.

4. The composite coated substrate according to claim 1, wherein the surface of the metallic substrate is bare metal.

5. The composite coated substrate according to claim 4, wherein the bare metal is cold-rolled steel.

6. The composite coated substrate according to claim 4, wherein the bare metal is galvanized steel.

7. The composite coated substrate according to claim 1, wherein the surface of the metallic substrate is pretreated with a pretreatment composition prior to application of the composite coating.

8. The composite coated substrate according to claim 7, wherein the pretreatment coating comprises zinc phosphate or iron phosphate.

9. The composite coated substrate according to claim 1, wherein the thermosettable polyester has reactive functional groups selected from the group consisting of hydroxyl, carboxylic acid, epoxy, carbamate, amide, carboxylate and combinations thereof.

10. The composite coated substrate according to claim 1, wherein the curing agent is selected from the group consisting of aminoplasts, blocked polyisocyanates, polyacids, polyepoxides, polyols, polyanhydrides, hydroxyalkylamides, and mixtures thereof.

11. The composite coated substrate according to claim 1, wherein the cyclic carboxylic acid anhydride is selected from the group consisting of maleic anhydride, chloromaleic anhydride, dichloromaleic anhydride, bromomaleic anhydride, citraconic anhydride, dimethylmaleic anhydride, ethylmaleic anhydride, itaconic anhydride, vinylsuccinic anhydride and vinyl trimellitate anhydride.

12. The composite coated substrate according to claim 1, wherein the alkene is selected from the group consisting of cycloalkenes, alpha olefins, vinyl monomers, esters of acrylic acid or methacrylic acid, and mixtures thereof.

13. The composite coated substrate according to claim 1, wherein the reactant is a primary amino alcohol selected from the group consisting of ethanolamine and propanolamine.

14. The composite coated substrate according to claim 1, wherein the flow control agent is an acrylic polymer.

15. The composite coated substrate according to claim 1, wherein the powder basecoating composition further comprises at least one visual effect additive selected from the group consisting of flake or plate pigments and metallized polymeric particles.

16. The composite coated substrate according to claim 1, wherein the flake pigment is aluminum coated mica or metal oxide-coated mica.

17. A composite coated substrate comprising:
    (a) a substrate selected from the group consisting of metallic substrates, polymeric substrates and combinations thereof, wherein a surface of the substrate is free of a primer coating;
    (b) a basecoat deposited upon the surface of the substrate, the basecoat being formed from a powder basecoating composition comprising:
        (i) at least one film-forming material comprising a thermosettable polyester and a curing agent;
        (ii) at least one reaction product of at least one cyclic carboxylic acid anhydride, at least one alkene and at least one reactant selected from the group consisting of primary amines, aliphatic polyamines, primary amino alcohols, alcohols, isocyanates and mixtures thereof, the copolymer having a number average molecular weight ranging from about 1,000 to about 20,000; and
        (iii) at least one flow control agent; and
    (c) a topcoat deposited from a liquid or powder slurry topcoating composition applied over the basecoat to provide a composite coated substrate.

18. A process for coating a metallic or polymeric substrate, comprising the steps of:

(a) applying a powder basecoating composition to a surface of a metallic or polymeric substrate, wherein the surface is essentially free of a primer coating,
the first powder basecoating composition comprising:
  (i) at least one film-forming material comprising a thermosettable polyester and a curing agent;
  (ii) at least one reaction product of at least one cyclic carboxylic acid anhydride, at least one alkene and at least one reactant selected from the group consisting of primary amines, aliphatic polyamines, primary amino alcohols, alcohols, isocyanates and mixtures thereof, the copolymer having a number average molecular weight ranging from about 1,000 to about 20,000; and
  (iii) at least one polymer flow control agent,
to form a powder basecoat on the surface of the substrate;
  (b) at least partially curing the powder basecoat to form a basecoat;
  (c) applying a liquid or powder slurry topcoating composition over at least a portion of the basecoat; and
  (d) at least substantially curing the topcoating composition and any uncured basecoat to provide a composite coating upon the surface of the substrate.

19. A process for coating a metallic or polymeric substrate, comprising the steps of:

(a) applying a powder basecoating composition to a surface of a metallic or polymeric substrate, wherein the surface is free of a primer coating,
the first powder basecoating composition comprising:
  (i) at least one film-forming material comprising a thermosettable polyester and a curing agent;
  (ii) at least one reaction product of at least one cyclic carboxylic acid anhydride, at least one alkene and at least one reactant selected from the group consisting of primary amines, aliphatic polyamines, primary amino alcohols, alcohols, isocyanates and mixtures thereof, the copolymer having a number average molecular weight ranging from about 1,000 to about 20,000; and
  (iii) at least one polymer flow control agent,
to form a powder basecoat on the surface of the substrate;
  (b) at least partially curing the powder basecoat to form a basecoat;
  (c) applying a liquid or powder slurry topcoating composition over at least a portion of the basecoat; and
  (d) at least substantially curing the topcoating composition and any uncured basecoat to provide a composite coating upon the surface of the substrate.

\* \* \* \* \*